Feb. 14, 1956 C. W. OTWAY 2,734,719
PRESSURE CORE TAKERS
Filed Oct. 11, 1951 5 Sheets-Sheet 3

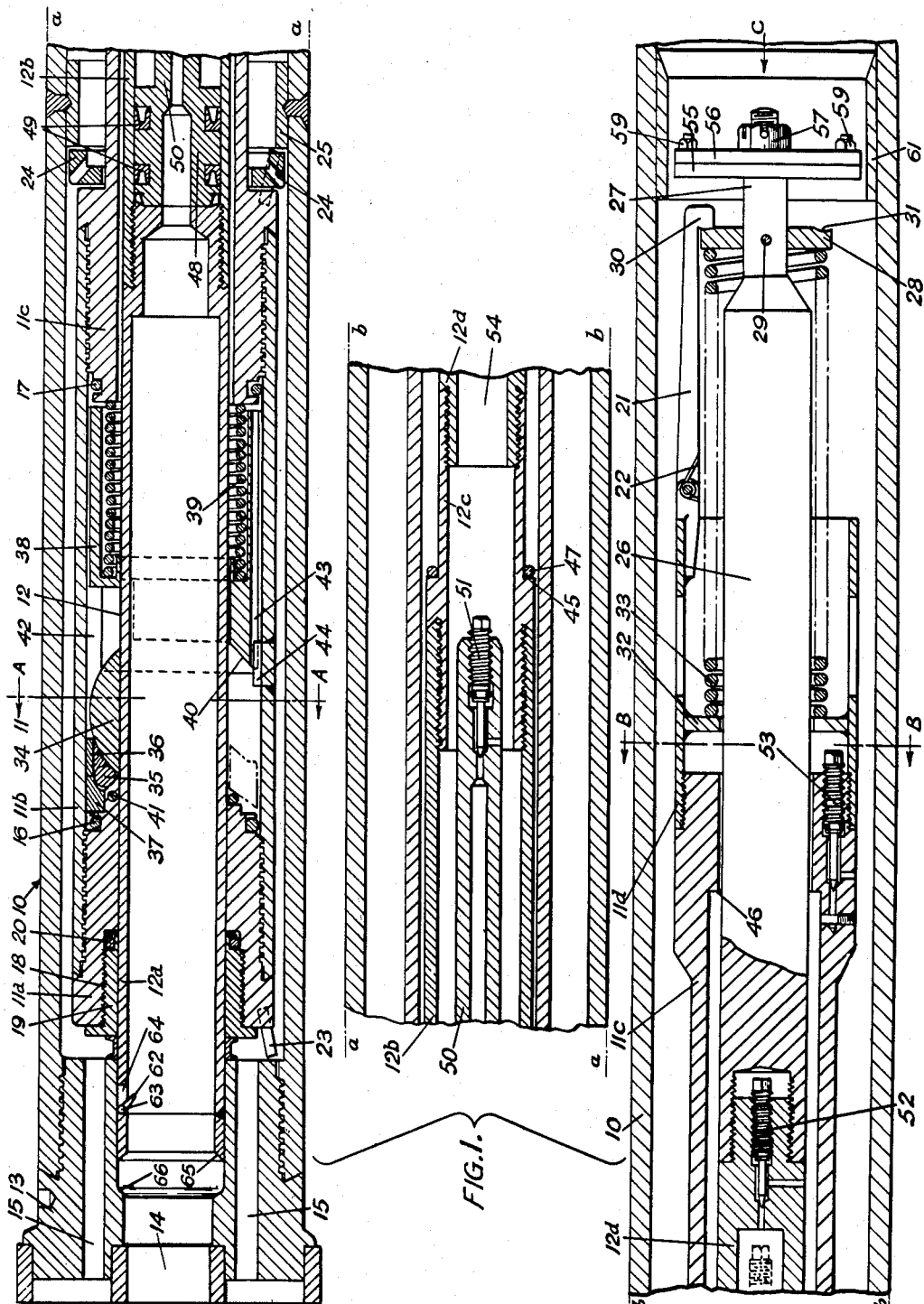

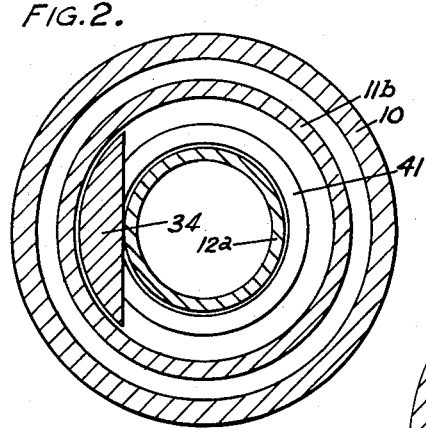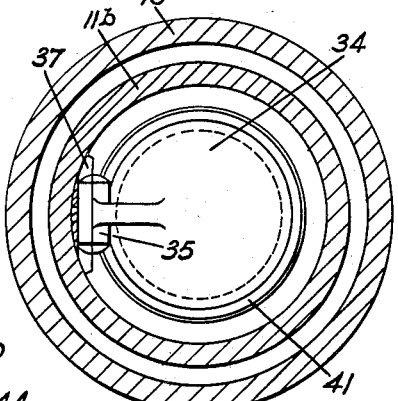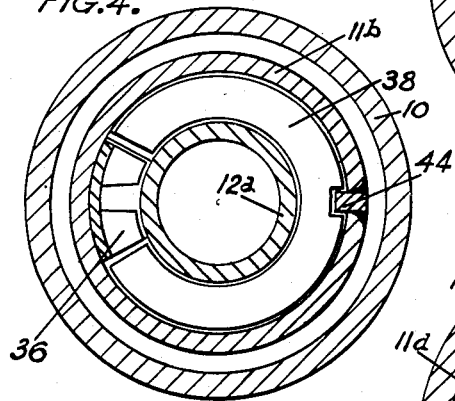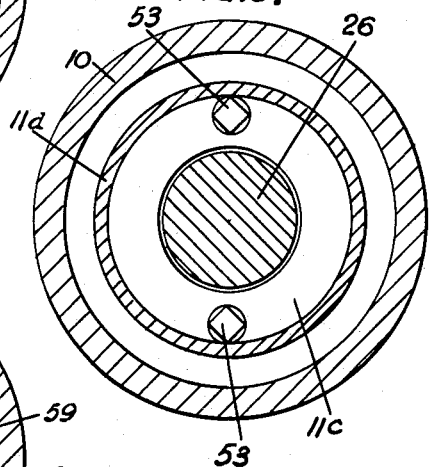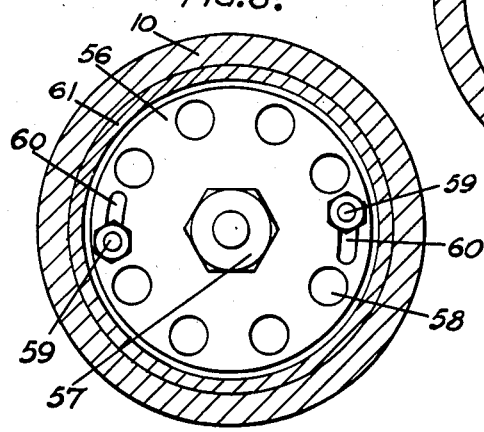

Inventor
Christopher William Otway
By Morgan, Finnegan & Durham
Attorneys

Inventor
Christopher William Otway
By [signature]
Attorneys

Feb. 14, 1956  C. W. OTWAY  2,734,719
PRESSURE CORE TAKERS
Filed Oct. 11, 1951  5 Sheets-Sheet 5
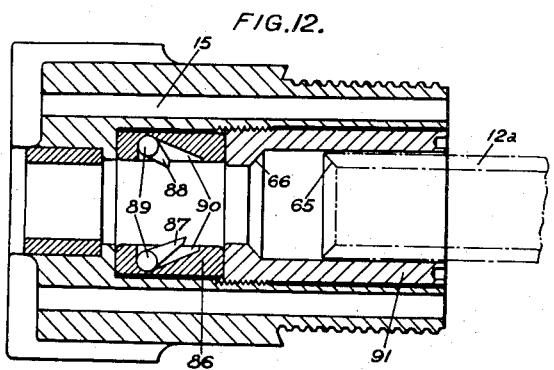
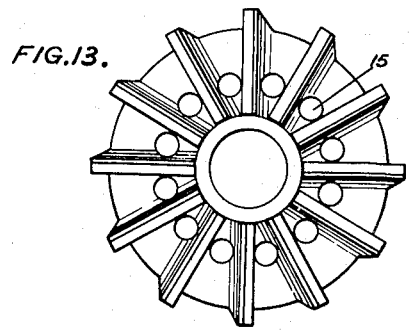
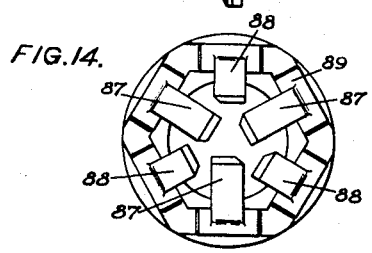
Inventor
Christopher William Otway
By Morgan, Finnegan & Durham
Attorneys

United States Patent Office 2,734,719
Patented Feb. 14, 1956

2,734,719
PRESSURE CORE TAKERS

Christopher William Otway, London, England, assignor to The British Petroleum Company Limited Application October 11, 1951, Serial No. 250,821

Claims priority, application Great Britain October 19, 1950

3 Claims. (Cl. 255—1.4)

This invention relates to pressure core takers. Existing types of pressure core takers do not give a true indication of the composition of the strata at the bottom of a bore hole due to reduction in pressure on the core on bringing it to the surface of the ground from the bottom of the hole. The pressure on a core which is sealed at the bottom of a hole under the pressure of the formation falls when the core is raised to the surface due to the temperature drop which occurs and possibly also due to leakages.

It is among the objects of the present invention to provide a pressure core taker for recovering a core on the surface of the ground at substantially the same pressure as the core left the formation, and which takes and seals the core more efficiently than existing core takers. It is a further object of the invention to provide a pressure core taker which has means for partly compensating for pressure losses (due to temperature changes and leakages) on the core after it has left the formation.

According to the invention, a pressure core taker comprises an outer barrel or drilling tube having a core drilling bit screwed to its lower end, an intermediate or pressure retaining barrel detachably secured within the outer barrel above the drilling bit and having a pressure sealing valve hinged to its lower end, and an inner or core barrel slidably located within the pressure retaining barrel, means being provided for breaking off the core, at the termination of the drilling, near the lower end of the core barrel which is adapted to move upwards, with the core, within the pressure retaining barrel and past the pressure sealing valve which is adapted to close positively after the core barrel has moved past it so as to seal off the core and core barrel within the pressure retaining barrel.

Advantageously the pressure sealing valve may be operated by spring means which automatically closes the valve when the core barrel has moved past it.

According to a further feature of the invention the pressure core taker may be provided with means for partly compensating for pressure losses on the core after it has left the formation. The means may consist of a pressure compensating chamber in the form of a cylinder located within the upper end of the core barrel and having a pressure tight piston located therein which moves in sympathy with changes of pressure on either side of it.

The invention will now be described by way of example with reference to the accompanying drawings in which:

Figure 1 is a longitudinal section along the axis of the core taker.

Figure 2 is a transverse section approximately along the line A—A in Figure 1 with the pressure sealing valve in the open position.

Figure 3 is a transverse section approximately along the line A—A in Figure 1 with the pressure sealing valve in the closed position and the upper half of the hinge piece removed.

Figure 4 is a transverse section approximately along the line A—A in Figure 1 with the pressure sealing valve removed.

Figure 5 is a transverse section along the line B—B in Figure 1.

Figure 6 is a view looking in the direction of the arrow C in Figure 1.

Figure 12 is a longitudinal section of a modified bit head incorporating a core breaker.

Figure 13 is an end view corresponding to Figure 12, and

Figure 14 is a transverse section through the core breaker assembly of Figure 12.

Figure 7:
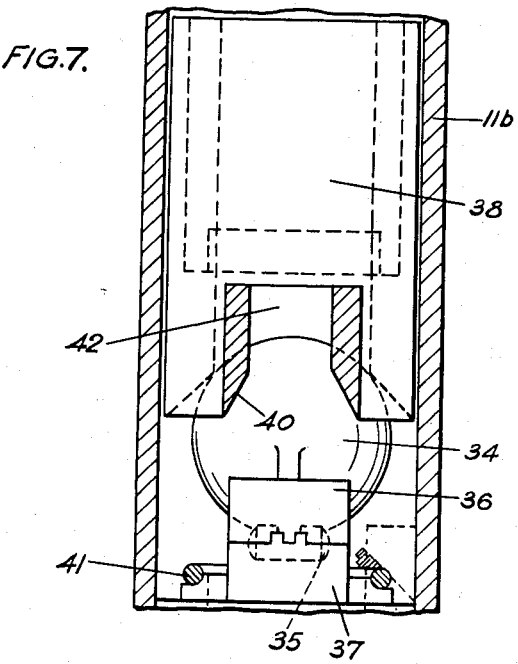
Figure 7 is a view of the back of the pressure sealing valve which is shown in the open position.
Figure 8:
Figure 8 is a perspective view of the pressure sealing valve.
Figure 9:
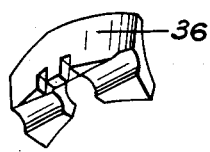
Figures 9 and 10 are perspective views of the upper and lower parts respectively of the hinge piece.
Figure 10:
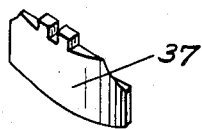

Referring first to Figures 1–10, the core taker consists of an outer barrel or drilling tube 10, an intermediate or pressure retaining barrel 11 and an inner or core barrel 12. The end of the outer barrel 10 is internally screw threaded to take the drilling bit 13 which has a large central hole 14 through which the core passes and a number of smaller holes 15 to allow the passage of drilling fluid. The pressure retaining barrel 11 is composed of a number of sections 11a, 11b, 11c and 11d screwed into one another as shown, rings 16 and 17 made of rubber, neoprene or like material being provided to ensure pressure tight connections between the sections 11a, 11b, and 11c. The section 11a has an internal screw thread 18 protected by an externally screw threaded annular member 19 having a sealing ring 20 made of rubber, neoprene or like material. The section 11d has three links 21 hinged symmetrically around its circumference, springs 22 being provided to urge the links to rotate about their hinges away from the axis of the barrel. Three locating pieces 23 arranged symmetrically and a brass locating ring 24 are provided to maintain the intermediate barrel 11 in position between the bit 13 and an annular member 25 in the outer barrel 10.

The core barrel 12 is also composed of a number of sections 12a, 12b, 12c and 12d screwed into one another as shown. The end section 12d has screwed to it an extension 26 which has an end 27 of reduced diameter on which is mounted a disc 28 secured by means of a tapered pin 29. The links 21 have perpendicularly turned ends 30 suitably shaped on one side to seat on a groove 31 in the disc 28. The end section 11d of the pressure retaining barrel has an annular ring 32 welded to it and a coiled spring 33 is provided between the ring 32 and the disc 28 and holds the disc 28 against the link ends 30 and so prevents the links 21 from rotating outward under the influence of their springs 22.

Located between the section 11b of the pressure retaining barrel and the section 12a of the core barrel is the core sealing valve 34 having a hinge 35 held between hinge pieces 36 and 37 secured in the pressure retaining barrel. A valve operating sleeve 38 actuated by a coiled spring 39 has an end face 40 which is set at an angle and which bears against the curved face of the valve 34. In the position shown in Figure 1 the valve 34 is prevented from rotating about its hinge by the section 12a of the core barrel. When the core barrel is retracted within the pressure retaining barrel and the section 12a is moved upwards past the valve 34, the latter, under the action of the sleeve 38, rotates about its hinge 35 and closes against a sealing ring 41 made of rubber, neoprene or like material thereby sealing off the lower end of the pressure retaining barrel.

The sleeve 38 is cut away at 42 to accommodate the hinge pieces 36 and 37 when the sleeve 38 is holding the valve 34 shut. The sleeve 38 is also provided with a slot 43 and a guide key 44 ensures that the sleeve does not rotate. When the core barrel is "tripped," that is to say when the links 21 are disengaged from the disc 28, the action of the spring 33 causes the core barrel 12 to move upwards within the pressure retaining barrel 11. The core barrel 12 moves upward until a shoulder 45 on the section 12c meets a shoulder 46 on the section 11c. A sealing ring 47 made of rubber, neoprene or like material makes a pressure tight connection between these two shoulders.

A pressure compensating piston 48, provided with U-shaped sealing members 49 to make it pressure-tight, is slidably located within the section 12b of the core barrel and has a hollow extension 50, of reduced diameter, provided with a needle valve 51. Needle valves 52 and 53 are also provided in the sections 12d and 11c of the core and pressure retaining barrels respectively. The space 54 between the piston 48 and needle valve 52 may be called the pressure compensating chamber.

The end 27 of the core barrel extension 26 has mounted around it two perforated plates 55 and 56 secured by means of a nut 57 and having holes 58 which, by rotation of one or other of the discs to the extent allowed by bolts 59 passing through slots 60, may be made to coincide or otherwise thereby presenting a lesser or a greater resistance to the drilling fluid passing through the tool. A ring 61 is secured in the outer barrel 10 in order to narrow the passage for the drilling fluid around the plates 55 and 56.

The section 12a of the core barrel is provided with three or more core catchers or breakers 62 spaced symmetrically around the barrel section. The core catchers are hinged at 63 and move back into recesses 64 when a core is being cut. Before a coring operation is commenced the pressure compensating chamber 54 is pressured up to a pressure approaching that at the bottom of the hole from which the core is to be taken. The parts of the apparatus are then assembled as shown in Figure 1 and the assembly is lowered, on the end of the drilling string, into the bore hole. At the bottom of the hole, the piston 48 takes up a position within its cylinder such that the pressure in the compensating chamber 54 equals that at the bottom of hole. Fluid is pumped down the outer barrel and coring is commenced. The core, together with some drilling fluid, passes through the hole 14 in the bit 13 and into the core barrel. When it is considered that a sufficient length of core has been drilled, drilling is stopped and the assembly is withdrawn slightly. The core catchers catch on the core and if the core is hard enough it prevents further upward movement of the core barrel and so trips the release mechanism, i. e. releases the links 21 from the disc 28. When the end 65 of the core barrel meets the shoulder 66 on the bit, further upward movement of the assembly causes the core to break off at the core catchers 62. If, however, the formations from which the core is being extracted is composed of soft rock, the initial upward movement of the assembly may cause the core to break off at the core catchers before the release mechanism is tripped. To ensure the release of these links two means may be employed. Firstly, a heavy iron rod or "go-devil" may be dropped down the outer barrel to strike against the core barrel extension causing it to be depressed and thereby releasing the links. Secondly the rate of circulation of fluid down the outer barrel may be increased and the resultant increased pressure against the plates 55 and 56 causes the core barrel to be depressed and the links to be released. The relative position of the two plates 55 and 56 is previously adjusted to enable this effect to be obtained with fluid of a particular viscosity.

With the core broken off from the formation and the links 21 released from the disc 28, the spring 33 causes the core barrel and core to move upwards and a pressure tight joint is made by the ring 47 between the shoulders 45 and 46. When the core barrel section 12a moves past the valve 34, the latter, under the action of the sleeve 38, closes against the ring 41 and seals off the core at the pressure of the formation.

Figure 11:
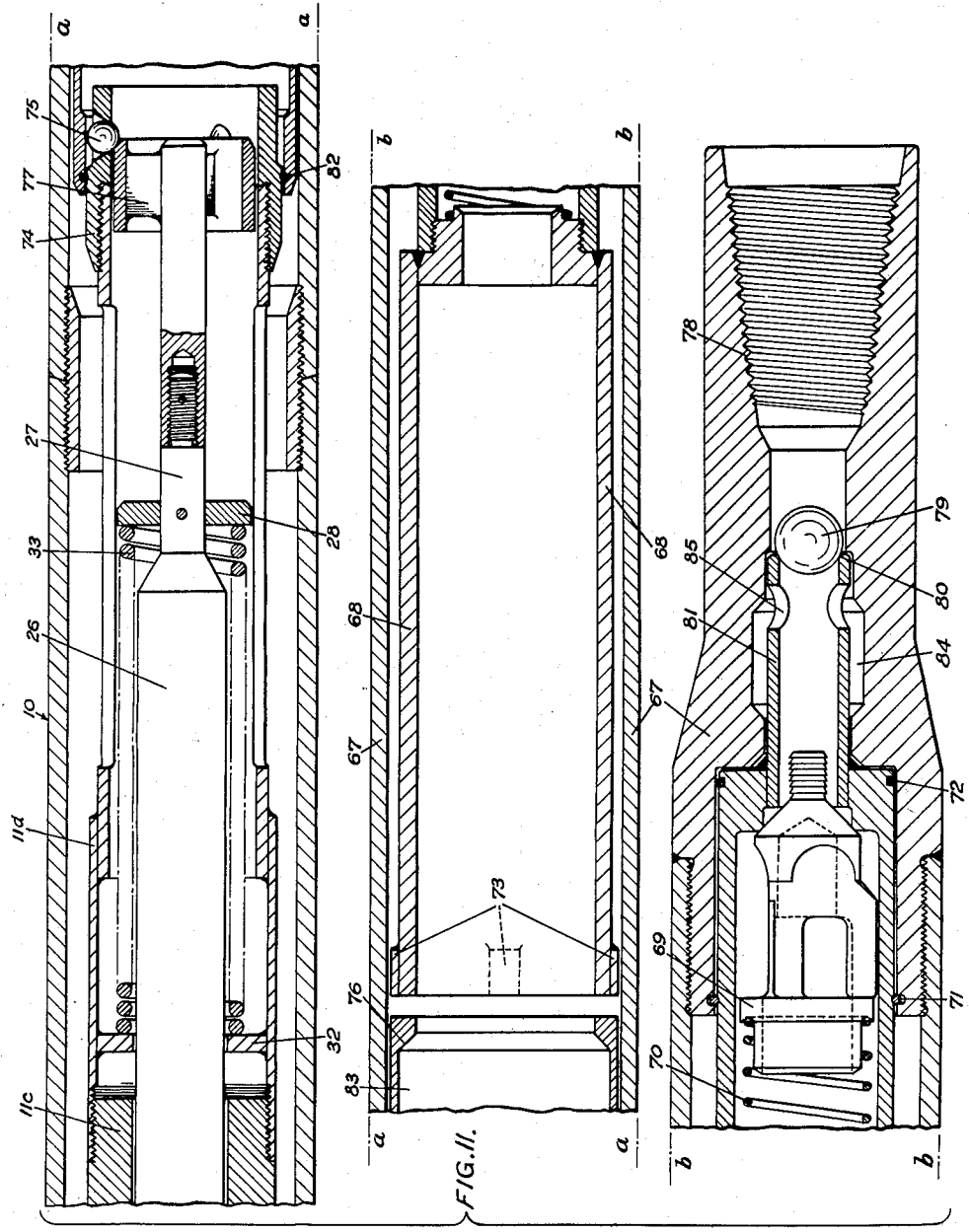
Figure 11 is a longitudinal section of an alternative arrangement for operating the tripping mechanism of the core barrel.

Referring now to Figure 11, the alternative arrangement for operating the tripping mechanism of the core barrel comprises an extension 67, of the outer barrel 10, which accommodates a sleeve 68 in which is housed a non-return valve 69 operated by a coiled spring 70. The non-return valve is provided for safety reasons only. The sleeve 68 is held in position in the extension 67 by a snap ring or circlip 71 and is sealed against leakage by a ring 72. Centralisers 73 are provided at the lower end of the sleeve 68. Section 11d of the pressure retaining barrel is extended and screwed to it is a collar 74 drilled symmetrically to accommodate three balls 75 which project into the bore of the collar and are held in that position by a trip sleeve 76. Attached to the end 27 of the core barrel extension 26 is a tripping head 77 which is urged upwards by spring 33 but is restrained by balls 75. The upper end of extension 67 is provided with screw thread 78 for attachment to the drilling stem.

After the core has been cut and broken off, a ball 79 is dropped into the drill pipe at the surface and comes to rest on a seat 80 provided on an extended neck 81 of sleeve 68. Pressure applied by the pumps which circulate the drilling fluid then forces the sleeve 68 downwards, overcoming the resistance of circlip 71, and allowing the lower end of sleeve 68 to press on trip sleeve 76 which in turn is forced downwards against the resistance of a circlip 82 until the retaining balls 75 move outwards into a recess 83 thereby releasing the tripping head 77. In the position immediately following the release of tripping head 77, the upper end of the neck 81 with ball 79 on its seat will be located in a circulation recess 84 thus allowing circulation to be re-established through holes 85 and thereby indicating positively that the tripping mechanism has been actuated. The core is then known to be sealed off within the pressure retaining barrel at the pressure of the formation.

Referring now to Figures 12–14, the modified bit head is provided with a core breaker assembly 86 having three large core breakers 87 and three small ones 88. The core breakers are attached by means of hinges 89 and when the core is being cut they move back into recesses 90. The core breaker assembly is held in position in the bit by means of a retaining sleeve 91 inside which the lower end of the section 12a of the core barrel is located when the core is being cut. Holes 15 are provided for the drilling fluid.

When the core has been cut and sealed, the assembly is then removed from the well, the bit unscrewed, and the pressure retaining barrel, having the core barrel sealed in it, is removed from the outer barrel and taken to the laboratory. Any fall in pressure on the core due to drop in temperature or leakage is partly compensated for by the piston 48. It will be understood that the primary purpose of the pressure core taker is to recover a core at the surface of the ground at a pressure whereby the gases and liquids contained in the core when it is cut are retained in the core when it is brought to the surface of the ground. The known technique of sealing off a core in a pressure-tight barrel after it has been cut, is not entirely satisfactory since the drop in temperature of the barrel and its contents when they are brought to the surface causes the contents of the barrel (which apart from the core itself are liquid) to contract. The resulting fall in pressure allows gases to escape from the core. By having a relatively large volume of gas at formation pressure in the "pressure compensating chamber," the reduction in volume of the liquid content of the sealed intermediate barrel 11 is taken up by movement of the gas-loaded piston 48 and the pressure on the core is maintained nearly at formation pressure so that there is little loss of contents from the core. In the laboratory, the fluid surrounding the core may be flushed away by a liquid such as mercury, whilst maintaining the core nearly at formation pressure. The contents of the core are then very nearly the same as when the core was cut and the pressure can then be reduced and the contents collected.

When the core is brought to the surface there may also be a slight leakage through the seals formed by rings 41 and 47 at either end of the intermediate barrel 11. The drop in pressure caused by such a leakage is also partly compensated for by movement of the piston 48 in the pressure compensating chamber which is not so susceptible to leakages as the intermediate barrel. The core barrel extension 26, the end section 11d of the pressure retaining barrel and the annular protecting member 19 are then unscrewed and a plug with a pump and manometer is attached in place of the member 19. A suitable flushing fluid, such as mercury, is pumped into the pressure retaining barrel past the valve 34 which opens slightly to allow the passage of the fluid, and fluid and gases are bled off at the needle valves 52 and 53 whilst maintaining the core substantially at the pressure at which it was taken. As gas escapes from the pressure compensating chamber, the piston moves up the chamber to the limit of its motion. When no further gas issues from the needle valve 52, the section 12d of the core barrel is removed to expose the needle valve 51 through which the gases and fluids expelled from the core can be bled off and collected. When all these gases have been collected, the core, which is then at atmospheric pressure, may be removed from the core barrel by opening the valve 34 or removing the section 11a if necessary.

I claim:

1. A pressure core taker, comprising an outer barrel, a core drilling bit secured to the lower end of the outer barrel; an intermediate barrel detachably secured within the outer barrel above the drilling bit, said intermediate barrel having an internal sealing shoulder portion adjacent its upper end; a pressure sealing valve hinged to the lower end of the intermediate barrel for sealing-off said lower end; an inner core barrel having its upper end closed for sealing off the upper end of said intermediate barrel whereby said intermediate barrel may serve as a pressure-retaining barrel, said core barrel having an internal piston-stop shoulder portion spaced from its lower end and having, between said piston-stop shoulder portion and the upper end of the core barrel, an external sealing shoulder portion disposed in opposing relation to the sealing shoulder portion of the intermediate barrel, said core barrel being slidably located within said intermediate barrel for axial movement upwardly therein with a core past said pressure sealing valve into a position wherein said sealing shoulder portions are in sealing engagement with each other at the upper end of said intermediate barrel; bleed valve means at the upper end of said intermediate barrel; a pressure-tight piston located in said core barrel at the upper side of said internal piston-stop shoulder portion so as to provide a pressure-compensating chamber in said core barrel at the upper side of said piston adapted to be filled with gas at high pressure, said piston being movable in response to changes of pressure on either side of it; bleed valve means carried by said piston; means for breaking off the core at the termination of drilling near the lower end of the core barrel; spring means for urging the core barrel in an upward direction with respect to the pressure-retaining barrel; engageable means on the intermediate barrel and core barrel for maintaining the core barrel in its lowermost position, against the action of the spring, while the core is being cut, which means is adapted to be disengaged to allow the core barrel and core to move upwards within the pressure-retaining barrel under the action of the spring after the core has been cut; and, spring means for automatically closing said pressure sealing valve after the core barrel has moved past it so as to seal off the core and core barrel within the pressure-retaining barrel.

2. A pressure core taker, comprising an outer barrel; a core drilling bit secured to the lower end of said outer barrel; an intermediate barrel detachably secured within said outer barrel above said drilling bit, said intermediate barrel having an internal sealing shoulder portion adjacent its upper end; a pressure sealing valve hinged to the lower end of said intermediate barrel for sealing off said lower end; an inner core barrel having its upper end closed for sealing off the upper end of said intermediate barrel whereby said intermediate barrel may serve as a pressure-retaining barrel, said core barrel having an internal piston-stop shoulder portion spaced from its lower end and having, between said piston-stop shoulder portion and the upper end of the core barrel, an external sealing shoulder portion disposed in opposing relation to the sealing shoulder portion of the intermediate barrel, said core barrel being slidably located within said intermediate barrel for axial movement upwardly therein with a core past said pressure sealing valve in a position wherein said sealing shoulder portions are in sealing engagement with each other at the upper end of said intermediate barrel; a pressure-tight piston located in said core barrel at the upper side of said internal piston-stop shoulder portion so as to provide a pressure-compensating chamber in said core barrel at the upper side of said piston adapted to be filled with gas at high pressure, said piston being movable in response to changes of pressure on either side of it; bleed valve means carried by said piston; means near the lower end of the core barrel for breaking off the core at the termination of drilling; spring means for urging said core barrel upwardly within said pressure retaining barrel; movable engageable means on the intermediate barrel and core barrel for maintaining said core barrel in its lowermost position therewithin, against the action of said spring means, while the core is being cut, said movable retaining means releasably engaging said core barrel to allow the core barrel and core to move upwards within the pressure retaining barrel under the action of said spring means after the core has been cut; spring-actuated valve closure means disposed between said core barrel and said pressure-retaining barrel for positively closing said pressure sealing valve after said core barrel has moved past said valve so as to seal off the core and core barrel within said pressure-retaining barrel; and a bleed valve in said pressure-retaining barrel for bleeding off gases when the core is being analyzed.

3. A pressure core taker, comprising an outer barrel, a core drilling bit secured to the lower end of the outer barrel; an intermediate barrel detachably secured within the outer barrel above the drilling bit, said intermediate barrel having an internal sealing shoulder portion adjacent its upper end; an inner core barrel slidable within the intermediate barrel, said core barrel having an internal piston-stop shoulder portion at its upper end; a hollow extension to the upper end of the core barrel, said extension having an external sealing shoulder portion for sealing engagement with the sealing shoulder portion of the intermediate barrel; a pressure-tight piston located within the hollow extension at the upper side of said piston-stop shoulder portion; the hollow extension being adapted to be filled with gas at high pressure on the upper side of the piston; means for breaking off a core after it has been cut; means in addition to the shoulder portion and including pressure responsive means for sealing off the ends of the intermediate barrel with the core and core barrel inside; and, means for releasably maintaining the core barrel in lowermost position in the intermediate barrel above the drilling bit while the core is being cut.

References Cited in the file of this patent

UNITED STATES PATENTS

| | | |
|---|---|---|
| 2,162,578 | Hacker | June 13, 1939 |
| 2,213,595 | Salnikov | Sept. 3, 1940 |

(Other references on following page)

UNITED STATES PATENTS

| | | |
|---|---|---|
| 2,238,609 | Sewell | Apr. 15, 1941 |
| 2,287,909 | Sewell | June 30, 1942 |
| 2,322,064 | Sewell | June 15, 1943 |
| 2,343,032 | Stokes | Feb. 29, 1944 |
| 2,343,805 | Sewell | Mar. 7, 1944 |
| 2,347,726 | Auld et al. | May 2, 1944 |
| 2,364,088 | Miller et al. | Dec. 5, 1944 |
| 2,381,845 | Stokes | Aug. 7, 1945 |
| 2,403,002 | Johnson | July 2, 1946 |
| 2,471,616 | Goodwin | May 31, 1949 |
| 2,557,925 | Stokes | June 26, 1951 |